(12) United States Patent
Boissy et al.

(10) Patent No.: US 9,489,290 B1
(45) Date of Patent: Nov. 8, 2016

(54) SCHEDULING TESTS BASED ON A VALUATION SYSTEM

(71) Applicant: The MathWorks, Inc., Natick, MA (US)

(72) Inventors: David M. Boissy, Harvard, MA (US); John E. Ciolfi, Wellesley, MA (US)

(73) Assignee: The MathWorks, Inc., Natick, MA (US)

( * ) Notice: Subject to any disclaimer, the term of this patent is extended or adjusted under 35 U.S.C. 154(b) by 1 day.

(21) Appl. No.: 14/072,515

(22) Filed: Nov. 5, 2013

Related U.S. Application Data

(63) Continuation of application No. 11/894,689, filed on Aug. 21, 2007, now abandoned, which is a continuation of application No. 11/323,550, filed on Dec. 30, 2005, now abandoned.

(51) Int. Cl.
G06F 9/44 (2006.01)
G06F 11/36 (2006.01)

(52) U.S. Cl.
CPC .................. G06F 11/3688 (2013.01)

(58) Field of Classification Search
CPC ........... G06F 11/3688; G06F 11/3672; G06F 11/368; G06F 11/3684
See application file for complete search history.

(56) References Cited

U.S. PATENT DOCUMENTS

| | | | |
|---|---|---|---|
| 5,475,843 A | 12/1995 | Halviatti et al. | |
| 5,481,741 A * | 1/1996 | McKaskle et al. | 345/522 |
| 5,630,049 A | 5/1997 | Cardoza et al. | |
| 5,729,676 A | 3/1998 | Inoue | |
| 5,758,061 A | 5/1998 | Plum | |
| 5,758,156 A * | 5/1998 | Kano | G06F 11/3672 713/100 |
| 5,774,725 A | 6/1998 | Yadav et al. | |
| 5,857,071 A | 1/1999 | Haley et al. | |
| 5,892,947 A | 4/1999 | DeLong et al. | |
| 5,909,544 A | 6/1999 | Anderson, II et al. | |
| 5,918,037 A | 6/1999 | Tremblay et al. | |
| 5,933,640 A | 8/1999 | Dion | |
| 6,002,869 A | 12/1999 | Hinckley | |
| 6,014,760 A | 1/2000 | Silva et al. | |
| 6,028,999 A | 2/2000 | Pazel | |
| 6,055,298 A | 4/2000 | Sugimoto | |
| 6,163,805 A | 12/2000 | Silva et al. | |

(Continued)

OTHER PUBLICATIONS

"Microsoft Computer Dictionary Fifth Edition", Microsoft, 2002, p. 424.*

(Continued)

*Primary Examiner* — Thuy Dao
(74) *Attorney, Agent, or Firm* — Nelson Mullins Riley & Scarborough LLP

(57) ABSTRACT

Disclosed herein are tools and methods for selecting and scheduling executable test program the use in testing, evaluating, monitoring, and analyzing an executable test program or any portion thereof. The tools and methods disclosed can analyze an executable test program developed in a text based programming language environment and an executable test program developed in a graphical modeling based programming environment. The tools and methods identify and analyze the quantitative measures of an executable test program and compute one or more scores for the executable test program. The tools and methods can use the scores computed to rank and order the executable test programs for execution to test an executable program or any portion thereof.

15 Claims, 7 Drawing Sheets

(56) References Cited

U.S. PATENT DOCUMENTS

| | | |
|---|---|---|
| 6,219,829 B1 | 4/2001 | Sivakumar et al. |
| 6,243,862 B1 | 6/2001 | Lebow |
| 6,360,268 B1 | 3/2002 | Silva et al. |
| 6,385,741 B1 | 5/2002 | Nakamura |
| 6,513,154 B1 | 1/2003 | Porterfield |
| 6,557,120 B1 | 4/2003 | Nicholson et al. |
| 6,668,340 B1* | 12/2003 | Baker et al. ............... 714/38.1 |
| 6,694,290 B1* | 2/2004 | Apfelbaum et al. ............ 703/22 |
| 6,701,514 B1 | 3/2004 | Haswell et al. |
| 6,779,134 B1* | 8/2004 | Laviolette ............ G06F 11/3006 714/38.12 |
| 6,941,546 B2 | 9/2005 | Apuzzo et al. |
| 6,986,125 B2 | 1/2006 | Apuzzo et al. |
| 7,028,290 B2 | 4/2006 | Srivastava et al. |
| 7,174,265 B2 | 2/2007 | Basham et al. |
| 7,363,616 B2 | 4/2008 | Kalyanaraman |
| 7,493,272 B2 | 2/2009 | Chen et al. |
| 7,496,904 B2 | 2/2009 | Srivastava et al. |
| 7,562,255 B2 | 7/2009 | El Far et al. |
| 7,886,272 B1 | 2/2011 | Episkopos et al. |
| 7,913,230 B2 | 3/2011 | Vikutan |
| 8,266,592 B2* | 9/2012 | Beto ............... G06F 11/3672 717/124 |
| 8,869,116 B2* | 10/2014 | Fliek ............... G06F 11/3672 714/31 |
| 8,881,111 B1* | 11/2014 | Smith ............... G06F 11/3692 717/125 |
| 9,058,424 B1* | 6/2015 | Bienkowski ........ G06F 11/3668 |
| 9,158,663 B2* | 10/2015 | Vaidyan ............ G06F 11/3668 |
| 2002/0138820 A1* | 9/2002 | Daly ............................ 717/126 |
| 2003/0046663 A1* | 3/2003 | Rogers et al. ................ 717/125 |
| 2003/0074407 A1 | 4/2003 | Zhang et al. |
| 2003/0145280 A1* | 7/2003 | Grey et al. ................... 715/513 |
| 2003/0154061 A1* | 8/2003 | Willis ............................. 703/4 |
| 2003/0204836 A1 | 10/2003 | Srivastava et al. |
| 2003/0208351 A1* | 11/2003 | Hartman ............ G06F 11/3688 703/22 |
| 2004/0015866 A1 | 1/2004 | Estep et al. |
| 2004/0153924 A1 | 8/2004 | Shinagawa et al. |
| 2004/0154001 A1 | 8/2004 | Haghighat et al. |
| 2005/0026130 A1 | 2/2005 | Crowhurst et al. |
| 2005/0081191 A1 | 4/2005 | Pomaranski et al. |
| 2005/0132332 A1 | 6/2005 | Sathe |
| 2005/0166094 A1 | 7/2005 | Blackwell et al. |
| 2005/0172268 A1* | 8/2005 | Kuturianu ........... G06F 11/3684 717/124 |
| 2005/0203717 A1 | 9/2005 | Parimi |
| 2006/0010448 A1 | 1/2006 | Sathe |
| 2006/0129994 A1 | 6/2006 | Srivastava et al. |
| 2006/0184918 A1 | 8/2006 | Rosaria et al. |
| 2006/0206870 A1 | 9/2006 | Moulden et al. |
| 2006/0265172 A1 | 11/2006 | Basham et al. |
| 2008/0010542 A1 | 1/2008 | Yamamoto et al. |
| 2009/0307763 A1 | 12/2009 | Rawlins et al. |
| 2014/0130017 A1* | 5/2014 | Wang .................. G06F 11/3672 717/124 |
| 2015/0309918 A1* | 10/2015 | Raghavan .......... G06F 11/3688 714/38.1 |

OTHER PUBLICATIONS

Zander-Nowicka et al., Quality of test specification by application of patterns, Oct. 2008, 6 pages.*

Molich et al., Tips and tricks for better usability test recommendations, Apr. 2006, 4 pages.*

* cited by examiner

SCHEDULING TESTS BASED ON A VALUATION SYSTEM

CROSS-REFERENCES

This application is a continuation of U.S. patent application Ser. No. 11/894,689 filed Aug. 21, 2007 titled, "Scheduling Tests Based on a Valuation System," now abandoned, which is a continuation of U.S. patent application Ser. No. 11/323,550 filed Dec. 30, 2005 titled, "Scheduling Tests Based on a Valuation System," now abandoned, by the present applicants, the content of which is incorporated herein by reference.

TECHNICAL FIELD OF INVENTION

The present invention generally relates to testing of a system or systems and, more particularly, to tools and methods for selecting tests to determine a state of the system or the systems.

BACKGROUND OF INVENTION

The complexity of software programs has increased dramatically over the past twenty years. During this time, tools created to test and verify the various functions and operations of developed software and software under development have also grown in number, size, and complexity to keep pace with software development. The tools used for conducting a test on logically or physically separate software components, or a complete software program with many components often form an environment together with other hardware, instrumentation, simulators, emulators, and other support elements to form a "test bed."

However, a test bed developed to exercise various functionality and operations of a developed software program often includes more test software or programs and analysis programs that can be executed in a reasonable amount of time. Moreover, new test programs and analysis programs are often added on a regular basis to increase the number of test programs executable forming the test bed. With such a test bed having a number of test programs and analysis programs it is often difficult and burdensome to determine which test or suite of tests to execute and in what order to carry out the testing and verification required of a new or modified software component that has been developed or is under development or a new or modified software program that has been developed or is under development.

Conventional methodologies for sorting and scheduling execution of test programs to verify the functions and the operations of software components and software programs along with the compliance of the software components and software programs to requirements or specifications has been based largely on a hit or miss approach often derived from historical experience or data. As such, it is often difficult to predict the quality of a test case using test program software selected in this manner as well as difficult to predict for execution time along with other constraints imposed on the test case such as cost.

SUMMARY OF INVENTION

The present invention provides tools and methods to overcome the above described difficulties with selecting and scheduling execution of test programs to test and verify the functions and operation of a system. The tools and methods of the present invention analyze a test program for specific attributes and assign a score to the program according to the attributes identified by the analysis. Each attribute identified represents a feature of the test program that serves to represent a quantitative measure of the test. The tools and methods of the present invention compute an overall score for the test program based on the scores computed for the attributes identified. The overall computed score can take the form of a weighted average of the scores computed for the identified attribute. The weights used are adjustable or customizable by a user based on requirements or goals of a test case or other instrument defining testing requirements.

In accordance with the teachings of the present invention, each test program in a library or a test bed can be analyzed for specific attributes and have an overall score computed for the test program that represents the quantitative measure of the test program. With at least a portion of the test programs having an overall score determined in accordance with the teachings of the present invention, test programs can be selected from the library or the test bed based on the computed overall scores and formed into a set of test programs or test suite for execution to test or analyze a software component, software components, or a software program with a number of components. Further, the test programs selected can be scheduled or ordered to execute in a desired order or scheduled based on a ranking of the test programs by using each program's computed overall score. The desired order can be based on an ascending order, a descending order, or any other order including, but not limited to parallel execution of selected test programs.

In one embodiment of the present invention, a method is disclosed for selecting one or more executable test programs from a plurality of executable test programs for use in testing a system. The method includes the steps of assigning a value to each of the plurality of executable test programs and selecting a set of the plurality of executable test programs for use in testing the system based on the values assigned. The value assigned to each executable test program represents a quantitative measure of the associated executable test program. The method can include the step of ordering members of the set of the executable test programs into a desired order based on the values assigned. The members of the set are orderable in either an ascending value order or a descending value order. The method can include the step of scheduling execution of the members of the set of executable test programs in accordance with the desired order.

The quantitative measure of an executable test program represents at least one or any combination of the following: A) a set of attributes representing a capacity of the executable test program to test one or more operations of the system; B) a set of attributes representing a capacity of the executable test program to test a number of linearly independent paths through at least a portion of the system; C) a set of attributes representing a capacity of the executable test program to determine a quantitative measure of complexity of at least a portion of the system directly from operations and operands in the system; D) a set of attributes representing a capacity of the executable test program to determine a quantitative measure of maintainability or a prediction of maintainability of at least a portion of the system; E) a set of attributes representing a capacity of the executable test program to determine a statistical measure between failures of at least a portion of the system; F) a set of attributes representing a time required for the executable test program to execute at least a portion of the system; G) a set of attributes representing a capacity of the executable test program to test dependencies of at least a portion of the system; or H) a set of attributes representing a capacity of the executable test program to determine an association between testing of at least a portion of the system and requirements defining a behavior of the portion of the system under test. The statistical measure of failures can be a mean time between failure (MTBF) measurement, a median time between failure, the variance between failures and other statistical measures.

The system or systems under test can include a model from a graphical modeling environment. When testing of the system includes a model the quantitative measure of an executable test program can represent at least one or any combination of the following: A) a set of attributes representing a capacity of the executable test program to test paths through a model of the graphical modeling environment; B) a set of attributes representing a capacity of the executable test program to provide test coverage for text based code generated from the model; or C) a set of attributes representing a capacity of the executable test program to provide test coverage for semantics of the model. Other model based quantitative measures can include model execution characteristics, such as step response, frequency response, phase shift, and the like.

The step of assigning the value can include the step of, determining the quantitative measure of each of the plurality of executable test programs.

In one aspect of the present invention, the value is a normalized value.

In another embodiment of the present invention, a computing device for use in testing a portion of a system is disclosed. The computing device includes a storage device holding executable test programs for use in testing the system and a test program evaluation engine. The test program evaluation engine accepts as input one of the executable test programs held by the storage device and generates as output a value representing a quantitative measure of the inputted executable test program. The test program evaluation engine can accept each of the executable test programs held by the storage device and generate as output a value for each of the accepted executable test programs to represent the quantitative measure of the evaluated executable test programs.

The computing device can include a scheduler for scheduling execution of a set of the executable test programs held by the storage device in an order defined by the values associated with the executable test programs forming the set. The order defined by the values can include either an ascending order or a descending order.

The system under test can include text based code, a model, a graphical model, a component, a device, or any combination thereof.

The test program evaluation engine is configurable to sort the executable test programs according to the value generated for each of the executable test programs.

In one embodiment of the present invention, a readable medium holding executable instructions for selecting one or more of the executable test programs, from a number of executable test programs, for use in testing at least a portion of a system is disclosed. Execution of the instructions computes a score for each of the plurality of executable test programs and selecting a set of the executable test programs for use in testing at least a portion of the system based on the scores computed. The score computed represents the quantitative measure of an associated executable test programs. The medium can include instructions for ordering members of the set of executable test programs into a desired order based on the scores computed. The members of the set can be ordered in an ascending score order or a descending score order.

The medium can include instructions for scheduling execution of the members of the set of executable test programs in accordance with the desired order.

The quantitative measure represents at least one of or any combination of the following: A) a set of attributes representing a capability of the executable test program to test one or more operations of the system; B) a set of attributes representing a capability of the executable test program to test a plurality of linearly independent paths through at least a portion of the system; C) a set of attributes representing a capability of the executable test program to determine a quantitative measure of complexity of at least a portion of the system directly from a plurality of operations and a plurality of operands in the system; D) a set of attributes representing a capability of the executable test program to determine a quantitative measure of maintainability or a prediction of maintainability of at least a portion of the system; E) a set of attributes representing a capability of the executable test program to determine a statistical failure measure of at least a portion of the system; F) a set of attributes representing a time required for the executable test program to execute at least a portion of the system; G) a set of attributes representing a capability of the executable test program to test dependencies of at least a portion of the system; or H) a set of attributes representing a capability of the executable test program to determine an association between testing of at least a portion of the system and requirements defining a behavior of the portion of the system under test. The statistical measure of between failures can be a mean time between failure (MTBF) measurement, a median time between failure, the variance between failures, and other statistical measures.

The system or systems under test can include a model from a graphical modeling environment.

Additionally, the quantitative measure can represent at least one of or any combination of the following: I) a set of attributes representing a capability of the executable test program to test paths through a model of the graphical modeling environment; J) a set of attributes representing a capability of the executable test program to provide test coverage for text based code generated from the model; or K) a set of attributes representing a capability of the executable test program to provide test coverage for semantics of the model.

In one aspect of the present invention the step of computing the score includes the step of, determining the quantitative measure of each of the executable test programs. In another aspect of the present invention, the score represents a normalized value.

In one embodiment of the present invention, a method for selecting one or more executable test programs for execution on one or more remote computing devices to test at least a portion of a system in a distributed computing environment. Performance of the method assigns a value to each of the executable test programs. The value represents a quantitative measure of an associated one of the executable test programs. Selects based on the values assigned at least one of the executable test programs for use in testing at least a portion of the system, and schedules execution of at least one of the selected executable test programs on at least one of the remote computing devices.

In another embodiment of the present invention, a computer readable medium holding computer executable instructions for selecting one or more executable test programs for execution on one or more remote computing devices in a distributed computing environment to test at least a portion of a system is disclosed. Execution of the instructions held by the medium assigns a value to each of the executable test programs. The value represents a quantitative measure of an associated one of the executable test programs. Further, execution of the instructions held by the medium selects based on the values assigned at least one of the executable test programs for use in testing at least a portion of the system, and schedules execution of at least one of the selected executable test programs on at least one of the remote computing devices.

In one embodiment of the present invention, a distributed computing system for performing distributed computing operations is disclosed. The system includes a first computing device hosting a test program evaluation engine and a scheduler. The test program evaluation engine is configured to assign a value to an executable test program representative of a quantitative measure of the executable test program. The scheduler is configured to schedule execution of the executable test program on a second computing device to test a portion of system controllable by the second computing device.

BRIEF DESCRIPTION OF THE DRAWINGS

An illustrative embodiment of the present invention will be described below relative to the following drawings.

DETAILED DESCRIPTION OF INVENTION

The present invention provides tools and methods for selecting and scheduling test programs for execution to test or evaluate a system. The present invention allows an engineer, programmer or other technical person to analyze a library or test bed of test programs and select those test programs which best fit a test scenario, test case or test requirements. The tools and methods disclosed herein analyze a test program and assign the test program an overall score that represents the quantitative measure of the test program. The overall score is a weighted average of scores assigned to the various attributes identified in the test program and allows for the weights to be adjusted or customized based on testing goals.

In this manner, an entire suite of test programs can be analyzed and based on the overall score computed for each individual test program in the suite that represents the quantitative measure of an associated test program, a scheduler or a user can define an order in which the tests are executed. The defined order can include execution of all or some of the tests in parallel. As such, tests below a predetermined threshold can be withheld from execution while tests with scores above a selected threshold can be scheduled for execution in an order defined by the overall test score for each test program. Additionally, tests that fall between the predetermined upper and lower threshold can be scheduled for execution on a frequency less than a scheduling frequency for those tests with scores above the upper threshold. In this manner, tests with scores above the predetermined upper threshold can be scheduled for execution on a continuous or near continuous basis, in parallel or not, and tests with scores that fall between the predetermined upper threshold and the predetermined lower threshold can be scheduled for execution, in parallel or not, on an as available basis, time permitting basis or other noncontinuous basis.

Before continuing with the detailed description it is helpful to first define a few terms as used herein.

The term "system" as used herein refers to an identifiable unit or component, physical or computable, responsive to an input or stimulus to produce an output. Examples of a system can include, but are not limited to, a model developed in a graphical modeling environment, code developed in a text based programming environment, a unit or component of hardware, or a group of items forming a unified whole.

Figure 1:
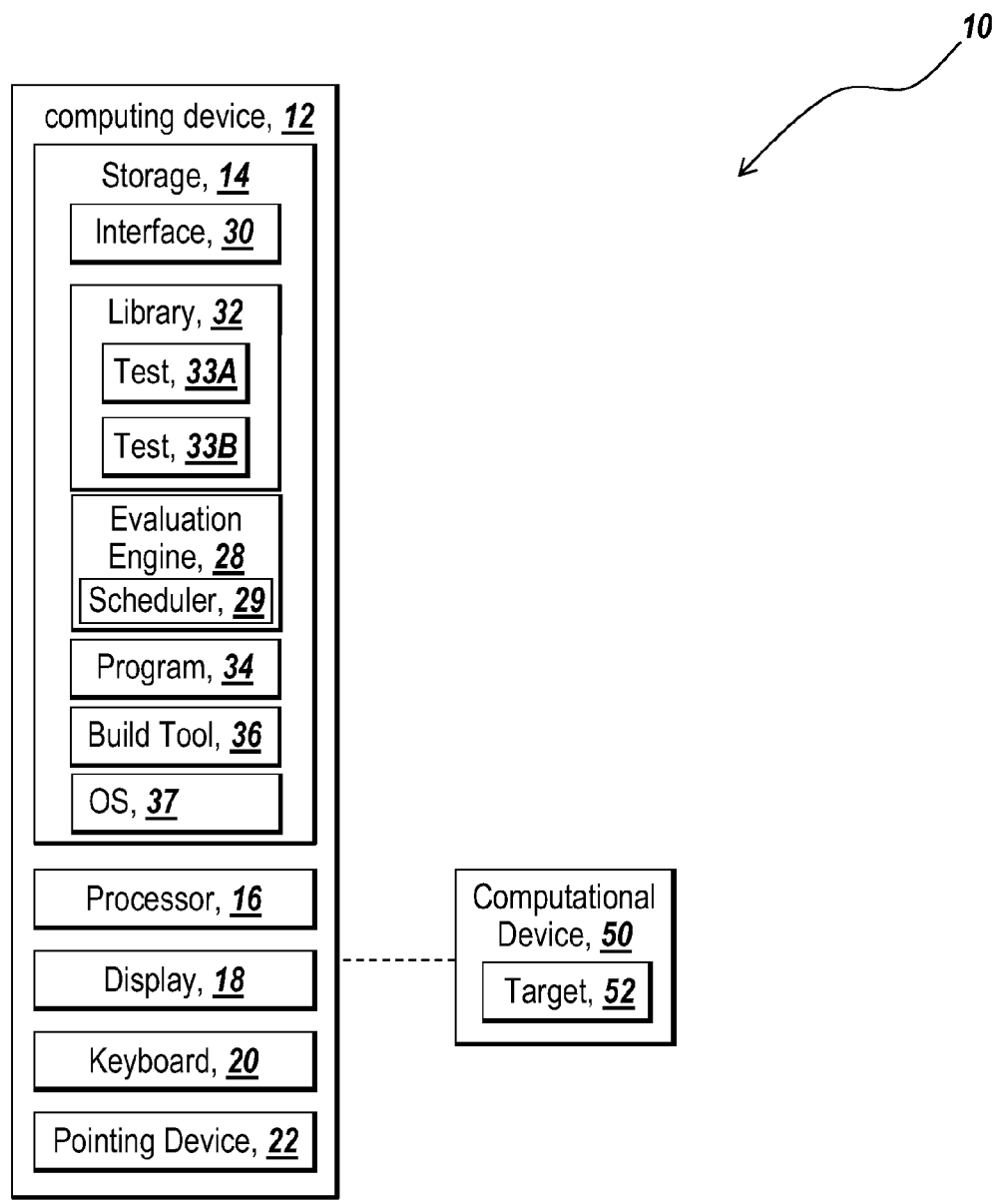
FIG. 1 is an exemplary block diagram illustrating an environment suitable for practicing the illustrative embodiment of the present invention.

FIG. 1 depicts an environment suitable for practicing an illustrative embodiment of the present invention. Computer system 10 includes a computing device 12, a microprocessor 16 for executing various instructions from an executable program and for controlling various hardware and software components, a display device 18 for use in rendering textual and graphical images, a storage device 14 for storing various items such as an interface 30, an evaluation engine 28, and an OS 37. The computing device 12 also includes a keyboard 20 and a pointing device 22, such as a mouse, track ball, or light pen. The evaluation engine 28 analyzes one or more executable test programs for example, executable test program 33A, executable test program 33B, or both for specific attributes and based on the analyzed attribute compute an overall score for the executable test program that represents the quantitative measure of the executable test program. The evaluation engine 28 includes a scheduler 29. The scheduler 29 is configurable to select, arrange in a desirable order, and schedule for execution the executable test programs 33A and 33B based in part or in whole on the overall score computed for each respective executable test program. The evaluation engine 28 is configurable to select a set of executable test programs from a plurality of executable test programs having desirable scores and arrange the members of the set in a desirable order for execution. The evaluation engine 28 can share the set of the executable test programs and the ordering with the scheduler 29. The scheduler 29 in turn schedules execution of the set of executable test programs in the desirable order. The scheduler 29 can schedule some or all of the members of the set to execute on one or a number of computing devices in parallel or schedule some or all of the members of the set to execute on one or a number of computing devices sequentially, or schedule some or all of the members of the set to execute on one or a number of computing devices in a hybrid manner that executes some members of the set in parallel and other members of the set sequentially.

Those skilled in the art will appreciate that the representation of the microprocessor 16 can take many different architectures and structures, for example, the microprocessor 16 can include multiple cores on a single die or can include multiple microprocessors on separate dies. Further, those skilled in the art will appreciate that the scheduler 29 can be physically or logically located outside of the evaluation engine 28 and can communicate, directly or indirectly, with the evaluation engine 28 to select, arrange in a desirable order, and schedule for execution the executable test programs 33A and 33B.

The storage device 14 can also store a library 32 for holding various executable test programs, executable analysis programs, or models used for testing the functions or operations of a program, such as executable program 34. The storage device 14 can also store a code build tool 36 for use in building and generating executable code.

Figure 1A:
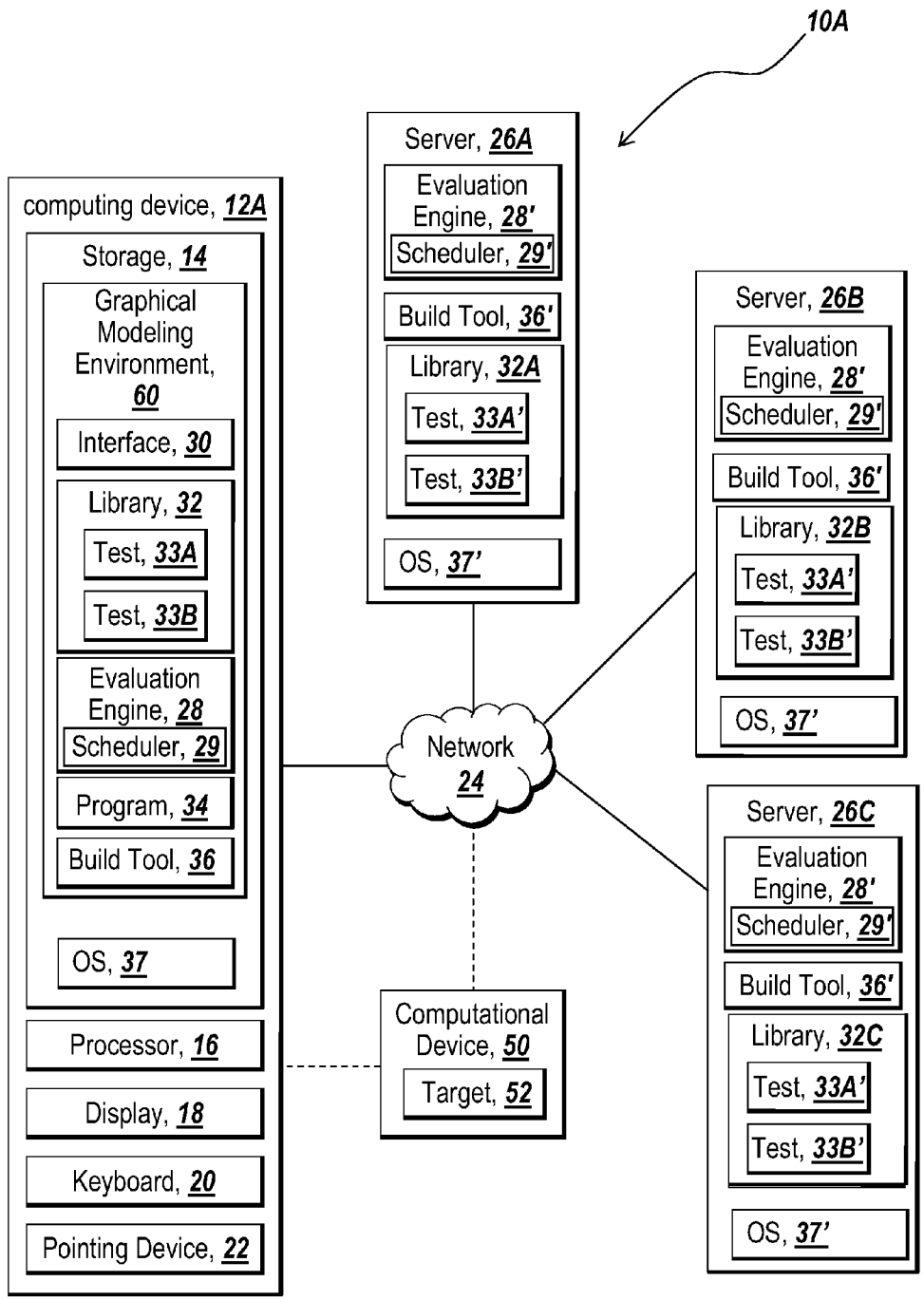
FIG. 1A is another exemplary block diagram illustrating a distributed computing environment suitable for practicing the illustrative embodiment of the present invention.

The library 32 in conjunction with the interface 30 allow a user to register with the computer system 10 executable test programs, executable analysis programs, models, a log, and the like for use in testing or verification of a function or an operation of a component, components, or the entire executable program 34. Those skilled in the art will appreciate that the illustration of the interface 30 and the library 32 are merely illustrative and these elements can be physically or logically located in another environment for example, a graphical modeling environment 60 as illustrated in FIG. 1A.

Those skilled in the art will appreciate that the interface 30 can take the form of a graphical user interface that provides a user of the computer system 10 with textual and graphical information to allow the user to browse, select, create, and modify programs held by the library 32 and to interact with the evaluation engine 28 and the code build tool 36. Those skilled in the art will also appreciate the interface 30 is also implementable as a command line interface or other suitable interface that allows a user to register an executable test program with the library 32 or to select a test program from the library 32, or interact with the evaluation engine 28, or the build tool 36.

The executable test programs of the present invention can be separate and distinct executable test programs or they can be related executable test programs. That is, the attributes of the executable test programs 33A and 33B can be created separately and independently of each other to create two different executable test programs. Alternatively, the attributes of the executable test programs 33A and 33A' can be related. That is the attributes of one of the executable test programs are modified to create two versions of the executable test program with different operational characteristics. For example, the executable test program 33A could be originally created to execute on a first platform and at a later point in time, its attributes are modified to allow the executable test program to execute on a second platform different from the first thus, creating two versions of the executable test program or the executable test programs 33A and 33A'. Additionally, those skilled in the art will appreciate that the executable test programs 33A and 33B can be different versions of a like executable test program.

Those skilled in the art will recognize that the computing device 12 includes other software such as interfaces in other programs, such as one or more other OS programs, compilers and various other program applications developed in a variety of programming environments for controlling system software and hardware components. Those skilled in the art will also recognize that the illustrative concepts discussed herein are applicable to object oriented programming frameworks, such as C++ and Modelica, as well as structured programming formats including C, Java, FORTRAN and the like, or in hybrid programming frameworks having OO properties and structured properties such as C#.

The evaluation engine 28 receives as input executable test programs held by library 32, for example, executable test programs 33A and 33B, or executable test programs held by the storage device 14. Additionally the evaluation engine 28 can receive as input executable test programs from the interface 30, or from any other suitable storage device or input device. The evaluation engine 28 in response to receipt of an executable test program determines the quantitative measure of the executable test program and generates an overall score for the executable test program. The overall score generated by the evaluation engine 28 represents the quantitative measure of the executable test program.

The evaluation engine 28 determines the quantitative measure of the executable test program by identifying and analyzing attributes of the executable test program and assigning a score or value to each identified attribute. Each identified attribute represents a feature of the executable test program and serves to represent the overall quantitative measure of the executable test program. Once the evaluation engine 28 has identified the attributes of an executable test program and assigned values to the attributes identified, a weighted average of these values is computed to generate an overall score which can be between 0 and 1 for the executable test program under evaluation.

Those skilled in the art will appreciate that the evaluation engine 28 can receive as input a number of executable test programs from, for example, the library 32, individually evaluate each provided executable test program and generate a weighted overall score for each evaluated executable test program to represent the quantitative measure of an associated executable test program in an alpha, numeric, or an alpha/numeric format. In this manner, the evaluation engine 28 can sort the received executable test programs based on the weighted overall score computed for each and schedule a set of the executable test programs for execution based on the weighted overall score to test the functions, operations, and requirements of a software component, software components or the entire executable program 34.

Using the scheduler 29, the evaluation engine 28 can schedule execution of the executable test programs based on an ascending order or descending order of the overall scores or can schedule execution of the executable test programs based on scores above, below, or between upper and lower threshold values and based on an ascending or a descending ordering, further, the evaluation engine 28 can schedule execution of the executable test programs in a sequential manner so that one test program completes execution before executing another test program or schedule execution of at least two of the executable test programs in a parallel manner so that at least two of the test programs are executing at a given time. The weighted average scores computed and assigned to the attributes of an individual executable test program are adjustable or customizable based on testing goals, requirements or other user preferences.

The code build tool 36 is configured to generate code for execution on a platform in an environment different from the environment in which the evaluation engine 28 operates.

One possible environment in which the code build tool 36 generates code for execution on a platform in another environment is discussed below with reference to FIG. 1A.

FIG. 1A illustrates a distributed embodiment of a computer system 10A in which the computing device 12A is configured to include a graphical modeling environment 60. The distributed computer system 10A includes the computing device 12A, a network 24, such as the Internet, an intranet, or other suitable network either wired, wireless or a hybrid of wired and wireless, a first server 26A, a second server 26B, a third server 26C, or other computing devices. In this manner, each of the servers 26A-26C coupled to the network 24 are adaptable to include the evaluation engine 28, the scheduler 29, the executable test program 33A, the executable test program 33B, and the build tool 36. The distributed computing environment depicted in FIG. 1A supports a distributed technical computing environment so that various computing tasks can be distributed amongst servers 26A-26C and the computing device 12A. Thus, the computing device 12A can be a first computing device and any of the servers 26A-26C can be a second, third and fourth computing device for distribution of computing tasks and operations. Additionally, any of the servers 26A-26C can be a first computing device and the remainder of the servers along with the computing device 12A can be a second, third, and fourth computing device for distribution of computing tasks and operations. In this manner, any number of users are able to access the evaluation tool 28 and the scheduler 29 via the network 24 to evaluate an executable test program, a suite of executable test programs or a "test bed" of executable test program and determine which executable test program should be selected for execution based on the output of the evaluation engine 28'. Likewise, any number of users are able to access the code build tool 36' via the network 24 to build or generate executable code from the program 34.

As illustrated, the storage device 14 includes the graphical modeling environment 60 and the OS 37. The graphical modeling environment 60 includes the interface 30, the library 32, the evaluation engine 28, the executable program 34, and the code build tool 36. Those skilled in the art will appreciate the illustration of the interface 30, the library 32, the evaluation engine 28, the scheduler 29, the executable program 34 and the build tool 36 in FIG. 1A is merely illustrative and these elements can be physically or logically located outside the graphical modeling environment 60 as shown in FIG. 1.

In an exemplary embodiment, the graphical modeling environment 60 such as a graphical modeling environment like SIMULINK® from The Mathworks, Inc. of Natick, Mass., provides a graphical and interactive environment by which engineers and other designers can use a model-based design approach to design and develop code for a computational device 50. With a model-based design approach, the graphical modeling environment 60 allows a block diagram model to be an implementation specification for automatically generating code. As such, design changes to the model can be quickly updated in the design model, evaluated by simulation and then automatically reflected in code generated for a target 52 by the code build tool 36.

The graphical modeling environment 60 can include the code build tool 36 to generate code for the implementation of the design represented by a block diagram model. That is, the code build tool 36, such as a code build tool like Real-Time Workshop® from The Mathworks, Inc., of Natick, Mass., generates and executes stand alone source code, such as the C programming language, for models created with the graphical modeling environment 60. As such, the executable program 34 can be a model developed in the graphical modeling environment 60 or can be a model developed in another environment but executable within the graphical modeling environment 60. The code build tool 36 can generate source code for the model or for subsystems of the model, compile the source code into object code, and build an executable program. The code may be designed to run on any processor, microprocessor, operating system, computational hardware device or component or component of a computational hardware device. Additionally, the code may be customized to run on a specific target hardware platform which could be an embedded processor.

The code build tool 36 obtains a block diagram model from the graphical modeling environment 60 along with other information and translates the blocks of the block diagram model to build or generate source code representing the functionality of the configured blocks in the block diagram model. The other information can be held, for example, in one or more files and include, templates, commands, input parameters, configuration data, source code date, and class definitions, and any other like information.

Before continuing with the detailed discussion, those skilled in the art will appreciate the graphical modeling environment 60 will be described below for illustrative purposes based on SIMULINK® from The MathWorks, Inc., of Natick, Mass. Nonetheless, those skilled in the art will appreciate that the principles in concept described below are equally applicable to other graphical modeling environments, such as Lab View, System View, Signal Processing Workstation, Hyper Signal, COSSAP, TargetLink, Dymola, and Ptolemy and other like graphical model environments. Furthermore, those skilled in the art will appreciate that the principles and concepts described below are equally applicable to text based programming environments such as C, C++, Fortran, C #, and the like.

Those skilled in the art will appreciate that the ability of the code build tool 36 to generate code from a graphical modeling environment or any other programming environment for execution on the target 52 in another environment allows the evaluation engine 28 to analyze and evaluate an executable test program held by the library 32 or another local location or another remote storage location to determine code coverage metrics and the like of the generated code.

Referring again to FIG. 1A, one exemplary technique for generating code from the block diagram model in the graphical modeling environment 60 is through the use of an automatic code generator, such as Real-Time Workshop® available from The MathWorks, Inc. of Natick, Mass. Other examples of suitable tools for use as the code build tool 36 include tools that generate HDL code from SIMULINK® such as DSP Builder available from Altera of San Jose, Calif., TargetLink available from dSpace of Germany, or System Generator for DSP available from Xilinx of San Jose, Calif.

Real-Time Workshop® uses target language compiled with script files, with a .tlc file extension, as input files to the code generation process. The .tlc files provide sections of programming instructions to be implemented for block references as they may be found in a block diagram model during the code generation process. The .tlc files can provide data and class definitions for data element references found in the block diagram model. Additionally, the .tlc files also comprise compiled directives, built-in functions and other code generation commands to direct Real-Time Workshop® during the code generation process. Nevertheless, those skilled in the art will recognize that Real-Time Workshop® can use formats other than the .tlc in addition to .tlc files.

The evaluation engine 28 and the scheduler 29 can operate and perform tasks in a platform independent manner, for example, using the concept of a virtual machine to help avoid cross platform compatibility issues should the computing device 12A be a first platform and any of the servers 26A-26C be a second platform different from the first. For example, the computing device 12A can be a WINDOWS based platform and the server 26A can be a SOLARIS base platform. Further, the server 26B can be a UNIX based platform while the server 26C is a LINUX based platform. Those skilled in the art will appreciate that other suitable platforms exists, for example, a DOS based platform, a MAC based platform, and like platforms.

The evaluation engine 28, the executable test programs 33A and 33A', and the executable test programs 33B and 33B' are well suited for use to operate and execute on the same platform in a distributed computing environment or operate and execute on different platforms in the distributed computing environment.

Figure 2:
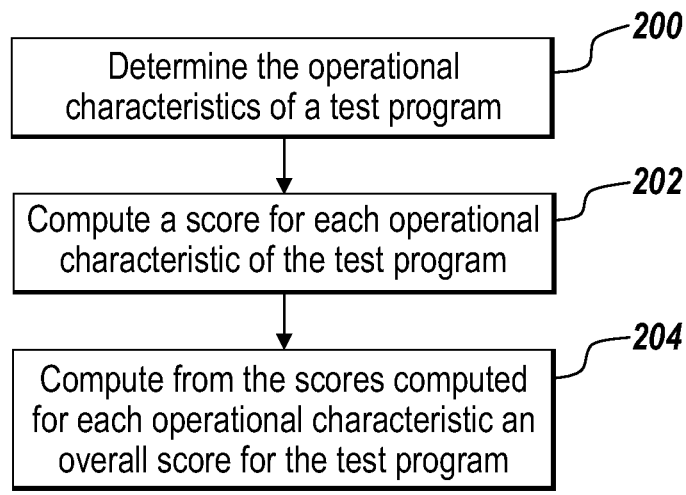
FIG. 2 is an exemplary flowchart that provides an overview of steps taken to practice the illustrative embodiment of the present invention.
Figure 3:
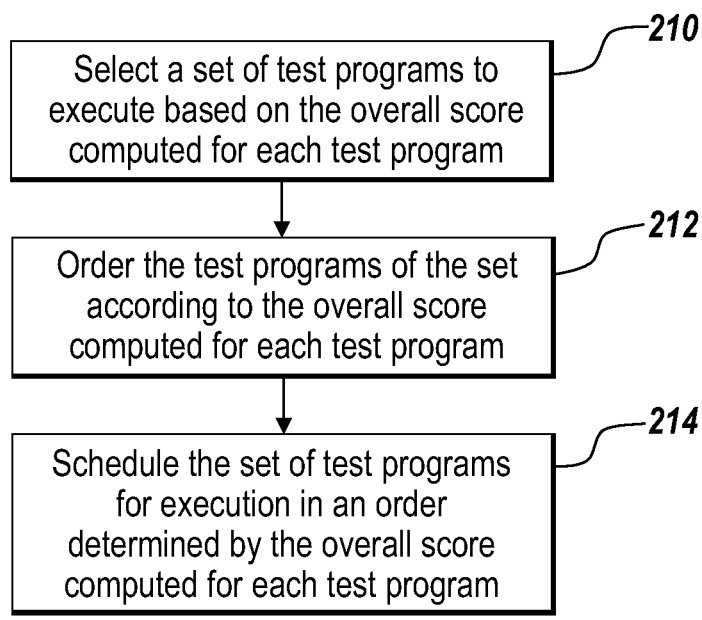
FIG. 3 is another exemplary flowchart that provides an overview of other steps taken to practice the illustrative embodiment of the present invention.

FIGS. 2 and 3 depict steps taken to practice an illustrative embodiment of the present invention and will be described in relation to FIGS. 1, 1A, 4, and 4A. In operation, the evaluation engine 28 accepts as input one or more executable test programs such as the executable test program 33A and the executable test program 33B. In step 200, the evaluation engine 28 determines the quantitative measure of a selected executable test program received as input. The evaluation engine 28 determines the quantitative measure of each executable test program received as input by identifying and analyzing attributes of the executable test program. The evaluation engine 28 defines a score or value to each analyzed attribute that represent the quantitative measure of the executable test program under evaluation.

In step 202, the evaluation engine 28 computes a score or value for each quantitative measure or test program attribute identified in step 200. In step 204, the evaluation engine computes using the scores computed for each analyzed attribute of the executable test program under evaluation weighted average of the scores or an overall score for the executable test program. The weighted average computed by the evaluation engine 28 represents the overall quantitative measure of the executable test program with regard to the test program's ability to test and analyze an executable program or a portion thereof and provide a measure of the ability of the executable test program to meet desired requirements for testing and analyzing the features of the executable program 34.

Figure 4:
FIG. 4 depicts an exemplary representation of a data structure suitable for use to practice the illustrative embodiment of the present invention.
Figure 4A:
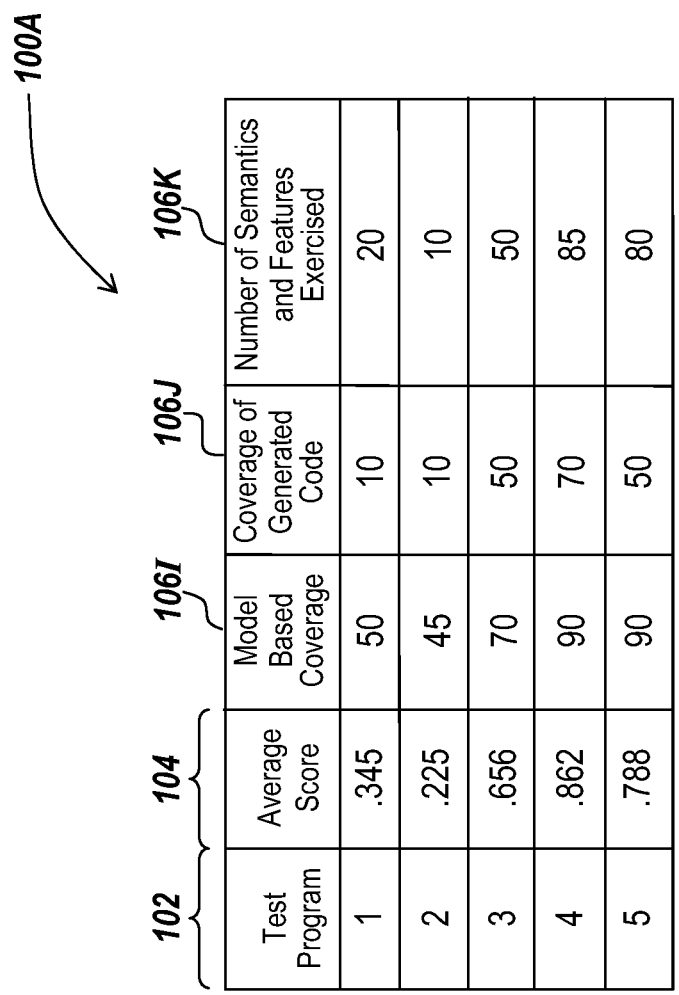
FIG. 4A depicts an exemplary representation of a data structure suitable for use to practice the illustrative embodiment of the present invention.

FIGS. 4 and 4A each depict an exemplary data structure 100 and 100A, respectively, suitable for use by the evaluation engine 28. In this manner, the scores computed by the evaluation engine 28 for each quantitative measure of each executable test program along with the computed average score of each executable test program can be placed in a format well suited for use by an engineer, a programmer, a computing device, or another hardware or code component. As depicted in FIG. 4, the exemplary data structure 100 provides a "scorecard" like representation. The scorecard can include a column 102 to identify the executable test program evaluated by the evaluation engine 28, a column 104 to identify the average score computed for an executable test program, and one or more columns 106A-106H to identify the scores computed by the evaluation engine 28 for the quantitative measures or attributes identified for each respective executable test program that represent the ability of a particular executable test program to test or analyze an executable program or a portion thereof for specific requirements, functions, operations, features, and the like. Those skilled in the art will recognize the labels associated with columns 106A-106H identify test types and test methodologies employed for testing and analyzing an executable program, a software component or multiple software components.

The test methodologies identified in FIGS. 4 and 4A are not meant to be limiting of the present invention and are provided merely to facilitate explanation of the present invention. Likewise, the evaluated overall scores shown in columns 106A-106H represent the ability of the associated executable test program to perform the test type or test methodology identified by the column label. As shown, the scores are based on a zero to one hundred score with one hundred being the highest score and zero being the lowest score. Those skilled in the art will recognize the score scale is reversible or compactable so that the scale ranges from for example, zero to ten with the best the score being a zero and worst score a ten. The software test methodologies and types depicted in FIG. 4 are well suited for use in testing and analyzing both model based code and text based code such as the C programming language, OO programming languages, the Modelica physical system modeling language, the VHDL-AMS modeling language, the Fortran programming language and the like. The test types and methodologies identified in columns 106I-106J in FIG. 4A are well suited for use in testing and analyzing graphical based languages such as SIMULINK® and UML.

Once the evaluation engine 28 has evaluated each received executable test program, or at any time a user chooses, the evaluation engine 28 in step 210 selects a set of test programs to execute based on the overall score computed for each executable test program. Execution of the set of test programs can be accomplished in a sequential manner, a parallel manner, or a combination of sequential execution and parallel execution. For example, in FIG. 4, test program B and test program F have the highest overall average score and therefore represent executable test programs having desirable quantitative measures for use in measuring, testing, and analyzing functions, operations, and compliance with the requirements of a selected executable program such as executable program 34. In step 212, the evaluation engine 28 orders the test programs of the test set according to the overall score computed for each executable test program. In this manner, should the higher average score represent the executable test program with the most desirable quantitative measure the evaluation engine 28 orders the set of test programs so that the test program with the highest score executes first and others follow in descending order.

Alternatively, the evaluation engine 28 can order text execution according to the average score in a descending order or in any other order desirable. In step 214, the evaluation engine 28 schedules execution of the set of test programs based on the order determined in step 212. As such, using the notion that the higher the average score represents the most desirable quantitative measure of an executable test program the evaluation engine 28 can order and schedule for execution in a sequential manner the tests identified in exemplary data structure 100 as follows, first to execute will be test B, followed by test F, followed by test E, followed by test C, followed by test D, and last to execute would be test program A. Additionally, using the notion that the higher the average score represents the most desirable quantitative measure of an executable test program the evaluation engine 28 can order and schedule for execution in a parallel manner the tests identified in exemplary data structure 100 as follows, test B, test F, test E, test C, test D, and test A. Further, using the notion that the higher the average score represents the most desirable quantitative measure of an executable test program the evaluation engine 28 can order and schedule for execution in a sequential manner and a parallel manner the tests identified in exemplary data structure 100 as follows, first to execute will be test B, followed by test F, followed by test E, and then tests C, D, and A are executed in parallel. Those skilled in the art will appreciate that above exemplary orderings and execution manner (i.e., sequential, parallel, or a combination of sequential and parallel) are meant for illustrative purposes to help facilitate the understanding of the present invention and other orderings and execution groupings are possible within the scope of the present invention.

The scores depicted under columns 106A-106K in FIGS. 4 and 4A represent the quantitative measure of an associated executable test program to analyze, measure or perform its test criteria associated with the identified test type or test methodology.

The test types or test methodologies identified in FIGS. 4 and 4A are well known in the art, nonetheless, a brief description of each test type or methodology to assist in the understanding of the present invention is provided below. Moreover, those skilled in the art will appreciate the test types and methodologies illustrated and discussed below are merely illustrative and the present invention is well suited for use with other test types and test methodologies.

Code coverage refers to an analysis method that determines which portions of a software program have been executed or covered by an executable test program, test bed or test suite. The portions of the software program not covered correspond to code that was not executed and therefore a low score may point to deficiencies in a testing strategy. Use of a code coverage metric is a direct measure of test completeness and is an aid to measure generated code quality. The score or value provided by the evaluation engine 28 for a test of this nature indicates the ability of the associated executable test program to execute or cover code of an executable software program under test.

The cyclomatic complexity test type or methodology refers to a measure of soundness and confidence for an executable program. A cyclomatic complexity testing methodology measures the number of linearly independent paths through a program module. This measure provides a single ordinal number and can be compared to the complexity of other programs. The score or value provided by the evaluation engine 28 for a test of this nature indicates the ability of an associated executable test program to measure the number of linearly independent paths through a program module.

The Halstead complexity methodology or technique refers to a measure of a program's computational complexity directly from source code. The score or value provided by the evaluation engine 28 for a test of this nature indicates the ability of an executable test program to determine a quantitative measure of complexity directly from the operators and operands of a program module.

Maintainability index refers to a quantitative measure of operational system's maintainability. The score provided by the evaluation engine 28 for a test of this nature represents the suitability of the executable test program to perform such a measurement. The maintainability index is an instantaneous measure and predictor of the software under test over time. Efforts to measure and track maintainability reduce or reverse a system's tendency to develop "code entropy" or degraded integrity and indicate when it becomes less expensive to rewrite the code than to maintain the code.

Statistical time between failure test methodology refers to a measure of how consistently a test fails. The value of the score provided by the evaluation engine 28 in this category identified by column 106E represents the quantitative measure or attributes of the associated test program to measure how consistently an executable program fails. Tests that fail frequently should be tested first to expose potential failures as quickly as possible.

The time required executing methodology or test type represents the time required to execute a test by the executable test program. The score in this category provided by the evaluation engine 28 represents the quantitative measure or attributes of the executable test program to execute the tests. It is often desirable to have tests that complete faster than other tests therefore improve test coverage by adding additional tests if desired.

The number of dependencies test methodology or test type identified in column 106G refers to the quantitative measure of the executable test program to measure, test or analyze the dependencies of a unit of software under test. Tests with a large number of dependencies may expose more failures than tests with fewer dependencies.

The number of requirements test type or test methodology referred to in column 106H refers to implementation independent descriptions of an external behavior of a system. The score in this column 106H provided by the evaluation engine 28 represents the quantitative measure of the associated test program to measure the number of requirements for a software module or software component under test. The number of requirements is an indirect measure of the complexity of the software module or system being tested.

Other quantitative measures of an associated executable test program to analyze, measure or perform its test criteria associated with the identified test type or test methodology can include, but is not limited to analysis of memory requirements, for example, as measured by program RAM, ROM, Stack RAM, and CPU utilization.

Still other quantitative measures of an associated executable test program to analyze, measure, or perform its test criteria associated with the identified test type or test methodology are equally applicable to distributed processing environments or parallel processing environments. For example, one quantitative measure for a distributed processing environment could be scheduling computationally intensive tasks on faster computing devices in a pool of computing devices. Those skilled in the art will appreciated that the term "faster" refers to the amount of time a selected computing device requires to complete the task and return a result.

Other quantitative measures of an associated executable test program to analyze, measure or perform its test criteria associated with the identified test type or test methodology can also include a measure of which test or tests are best suited for or are closest to changes made to the code. For example, if a code change is made in a certain module of the overall code, the evaluation engine 28 is useful to identify those tests related to the certain module in order to execute theses tests first.

Those skilled in the art will appreciate that the exemplary data structures 100 and 100A are configurable to add columns or remove columns as necessary. In this manner, as quantitative measurement capabilities of the evaluation engine 28 are increased or decreased the exemplary data structures 100 and 100A can be sized to accommodate the quantitative measurement capabilities of the evaluation engine 28.

The above-described test methodologies are applicable to both text (including scripting languages) and graphical based programming languages. The methodologies and techniques described next are applicable to graphical based programming or modeling languages.

Model based coverage test type or test methodology referred to in column 106I refers to a determination by the executable test program of the extent to which model pathways are exercised during a simulation or test. The score or value provided by the evaluation engine 28 for such a test type or test methodology represents the ability of the executable test program (i.e. quantitative measure) to exercise the various pathways of a model. Model coverage is a measure of how thoroughly an executable test program exercises a model.

Coverage of generated test type or test methodology identified in column 106J code refers to a measurement by an executable test program to test or analyze text based code generated from a model in a graphical modeling environment. The score or value provided by the evaluation engine 28 for such a test type or test methodology represents the quantitative measure of the associated test program to determine which portions of the generated software have been executed or covered and which portions have not.

The number of significant semantics and features exercised test type or test methodology referred to in column 106K refers to the measure and test of semantics used in a graphical modeling environment. The score or value provided by the evaluation engine 28 for this category of test type or test methodology represents the quantitative measure of the associated executable test program and thus the ability of the associated executable test program to measure a set of semantics of a model in a graphical modeling environment. Those skilled in the art will appreciate graphical models such as UML and SIMULINK® come with a set of semantics, such as state machines, events, use cases, and constraints which software developers utilize in model development. Semantics of this nature are not intrinsic in text based languages generated from the graphical model.

Figure 5:
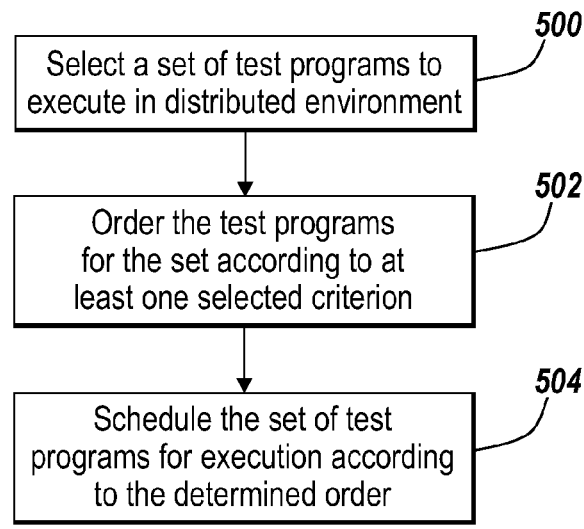
FIG. 5 is an exemplary flowchart that provides an overview of steps taken to practice an illustrative embodiment of the present invention when executing a test or tests in a distributed computing environment.

FIG. 5 depicts steps taken to practice an illustrative embodiment of the present invention and will be described in relation to FIGS. 1A, 2, 3, and 6. The steps depicted in FIG. 5 are well suited for use when executing a suite of tests or a test methodology in a distributed environment such as illustrated in FIG. 1A. Furthermore, the steps depicted in FIG. 5 can account for variance amongst the computing devices in the distributed environment on which the executable test programs execute. For example, the present invention is able to select and order executable test programs to test a portion of a system based on the above-described test evaluation and analysis of executable test program attributes performed by the evaluation engine 28 and can account for other criteria, such as criteria related to a distributed computing environment, to select, order, and schedule for execution the selected executable test programs in the distributed computing environment. Such criteria can include but are not limited to the platform on which the executable test program executes, the memory characteristics of which the executable test program executes, and the like. In this manner, the teachings of the present invention can account for and accommodate a test bed, a test schedule, a test methodology, and the like well suited for execution across multiple different platforms, for example executing the same tests or a variation of the same test on a MICROSOFT product based platform, on a LINUX based platform, on a SOLARIS based platform, on a UNIX based platform, on a MAC based platform and on any other type of platform.

At anytime, before or after the evaluation engine 28 has completed evaluating the executable test programs a user of the computing device 12A or any of the servers 26A-26C can select any number of executable test programs from a number of executable test programs held by a storage device to execute in a distributed environment. Additionally, the evaluation engine 28 is configurable to programmatically select any number of executable test programs from the number of executable test programs held by the storage device to execute in a distributed environment.

In step 500, a set of executable test programs are selected from a number of executable test programs to execute in a distributed environment based on either the overall score computed for each executable test program, based on other criteria, or based on a combination of the respective scores and other criteria. Some examples of executable test programs are depicted in the exemplary data structures 100 and 100A, the libraries 32, 32A, 32B, 32C, and the storage device 14. In step 502, the selected executable test programs are ordered in a desirable order according to at least one selected criterion. The evaluation engine 28 is configurable to select and order the set of executable test programs. In step 504, the set of executable test programs are scheduled for execution according to the determined order.

Figure 6:
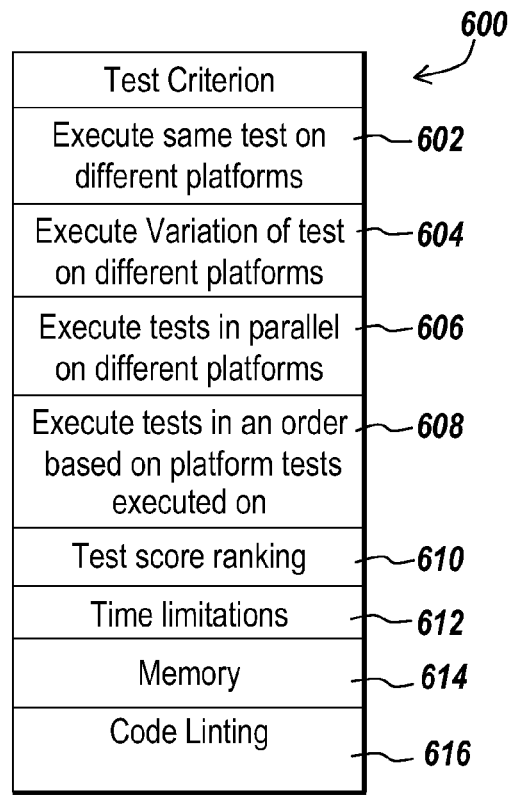
FIG. 6 depicts a table of exemplary test criterion used for selecting and scheduling tests in accordance with the teachings of the present invention.

FIG. 6 illustrates a table of exemplary criteria selectable by a user, any of the servers 26A-26C, the computing device 12A, a user of the computing device 12A, or a user of any of the servers 26A-26C. Table 600 includes a number of test criteria that are well suited for use when selecting and scheduling executable test programs for execution in a distributed environment. In this manner, variations between the different platforms on which the selected executable test programs execute are accounted for and those variations and other factors are used as part of the criteria for selecting and scheduling which of the executable test programs from the set or test bench to test a system. Those skilled in the art will appreciate that the test criteria depicted in Table 600 is merely illustrative and other test criteria can be included in the Table 600 without departing from the scope of the present invention.

Test criteria 602 can raise, lower or leave unchanged the average score 104 computed by the evaluation engine 28. The test criteria 602 is well suited for use to select an executable test program capable of executing on different platforms. In this manner, an executable test program from the test bench unable to execute on at least two different platforms can be bypassed during the process to select executable test programs for testing a system. In other words, the selection process can select those executable test programs capable of executing on different platforms to test the system.

Test criterion 604 can raise, lower, or keep the same the average score 104 computed by the evaluation engine 28. The test criterion 604 is well suited for use to identify variations of the executable test program that are executable on different platforms. In this manner, a platform that has intensive memory capacity characteristics can execute a version of the executable test program with intensive memory characteristic needs while another version of the executable test program with less intensive memory characteristic needs is executed on another platform that has less intensive memory capacity characteristics. Those skilled in the art will appreciate that other variations of the same test are possible depending on the operational characteristics of the platforms on which the executable test programs are scheduled to execute.

The test criterion 606 can raise, lower or keep the same the average score 104 computed by the evaluation engine 28. The test criterion 606 is well suited for use in identifying those tests that are executable in parallel (i.e., at the same time) across different platforms.

Test criterion 608 can raise, lower, or keep the same the average score 104 computed by the evaluation engine 28. The test criterion 608 is well suited for use in selecting and arranging an order of execution for the selected executable test programs based on the platforms on which the executable test programs execute. In this manner, if a selected executable test program executes faster on one type of platform and slower on another type of platform, the execution speed or time required to execute the executable test program can be used to arrange the ordering of the executable test programs to schedule the execution of the executable test programs on the different platforms. For example, the executable test program may be scheduled to execute first on the platform on which it executes fastest and scheduled to execute last on the platform on which it executes slowest.

Test criterion 610 can raise, lower or keep the same the average score 104 computed by the evaluation engine 28. The test criterion 610 is well suited for use when the test coverage results for different executable test programs are combined. For example, if test one covers, "x", and test two covers, "y", then the combined tests may cover less than "x+y" because some of the coverage overlaps. As such, you can have two different tests, but a marginal increase in the test coverage over running just one or the other. Thus, the minimal increase in test coverage results of the combined tests compared to the testing time involved may not be a benefit and the user may choose to select a new combination of executable test programs or choose to execute one but not both of the executable test programs.

Test criterion 612 can raise, lower or keep the same the average score 104 computed by the evaluation engine 28. The test criterion 612 is well suited for use in selecting and arranging an order of the executable test programs for execution based on a test coverage per unit of time analysis to maximize test coverage for the code under test for a unit of time. In this manner, selection and arrangement of the order of the executable test programs for execution can be based on time and test coverage. In other words, instead of executing one executable test program that provides a test coverage of "x" and executes for "y" time, multiple executable test programs that collectively provide test coverage of "x" as well but that collectively execute for less than "y" time can be selected, arranged in a desirable order for execution, and scheduled for execution in the desirable order. Thus, the user can combine a number of executable test programs to form a set of executable test programs. In this manner, instead of selecting an executable test program that provides the most test coverage but also take the most time to execute, the user can select a number of tests that collectively take the same or less time to execute but provide increased test coverage.

Test criterion 614 can raise, lower, or leave unchanged the average score 104 computed by the evaluation engine 28. The test criterion 614 is well suited for use in selecting and arranging an order of the selected executable test programs when taking into account the memory usage of the various executable test programs, memory usage of the system under test, and the memory characteristics of the various platforms on which the selected executable test programs execute. Test criterion 614 is well suited for use with either a single computing device or with multiple computing devices in a distributed environment. In this manner, the executable test programs that require a significant amount of memory can be ranked different from those executable programs that require less memory. Thus, memory intensive executable test programs can be identified as undesirable should any of the computing devices on which the executable test programs execute has insufficient memory capacity or if execution of the memory intensive executable test programs burden the memory capacity of the computing device such that the processing speed of the computing device slows to an undesirable speed. Additionally, test criterion 614 is well suited for use to select executable test programs based on memory coverage analysis for any of the executable test programs. For example, to detect memory management and threading issues, memory leakage and memory corruption detection, of the unit under test.

Test criterion 616 can raise, lower, or leave unchanged the average score 104 computed by the evaluation engine 28. The test criterion 616 is well suited for use in selecting and arranging an order of the selected executable test programs when taking into account code syntax, code semantics and code usage errors using, for example, a rule set to ensure code correctness or to improve code quality of the system under test.

Those skilled in the art will appreciate that the evaluation engine 28 is configurable to select and order a set of executable test programs based on the above discussed criteria applicable to executing test programs in a distributed environment or on a sole computing device.

Figure 7:
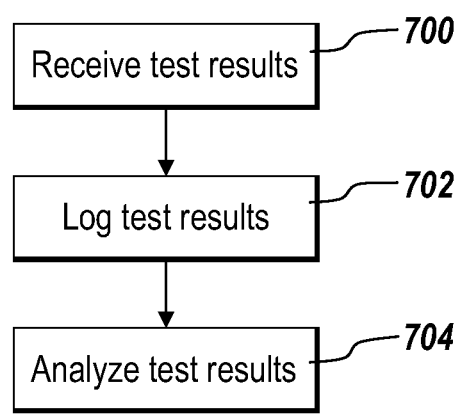
FIG. 7 is another exemplary flowchart that provides an overview of steps taken once the executable test program has executed and results are available.

FIG. 7 depicts steps to process test results from an executed test program or executed test programs that were executed either on a single computing device or on multiple computing devices in a distributed environment. In step 700, the computing device 12A receives the test results from any of the servers 26A-26C or from the executable test programs 33A or 33B executed on the computing device 12A. In step 702, the computing device 12A logs the test results, for example to the storage device 14. In step 704, the test results are analyzed. In this manner, by logging the test results a historical database of results is created and over time it can be used as a basis for executable test program selection criteria. Additionally, the logging of the test results allows a programmer, engineer, or other technical staff member to keep track of "sporadic" test failures and uses this information as a guide for selecting executable test programs. "Sporadic" test failure refers to intermittent test failures such as when the test executes the first time and a failed result is returned and the test is executed a second time and a pass or other positive result is returned without making any changes to the code under test or the executable test program.

While the present invention has been described with reference to an illustrative embodiment thereof, one skilled in the art will appreciate that there are changes in form and detail that may be made without departing from the intended scope of the present invention as defined in the pending claims. For example, the evaluation engine of the present invention is configurable to identify and analyze other features of an executable test program in addition to attributes representing a particular type of test or test methodology. That is, the evaluation engine can factor in other metrics, for example, historical data regarding the use of one or more executable test programs when computing an overall score for an executable test program under evaluation.

What is claimed is:

1. A method comprising:
analyzing a plurality of attributes of a first test program for testing an executable program,
the analyzing performed using one or more processing devices;
generating a plurality of values for the plurality of attributes of the first test program,
the generating based on the analyzing, and
the generating performed using the one or more processing devices;
representing a plurality of quantitative measures for the first test program using the plurality of values;
computing a plurality of scores for the plurality of quantitative measures of the first test program;
computing a first weighted score for the first test program based on the plurality of scores,
the first weighted score representing the ability of the first test program to test the executable program, the executable program being at least a portion of a graphical model that is executable in a graphical modeling environment, and
the computing performed using the one or more processing devices;
interacting with a second test program for testing the executable program, the second test program being a separate and distinct program from the first test program,
the second test program having including the plurality of attributes;
analyzing the plurality of attributes of the second test program;
generating a plurality of values for the plurality of attributes of the second test program, the generating based on the analyzing the plurality of attributes of the second program;
representing the plurality of quantitative measures for the second test program using the plurality of values of the second test program;
computing a plurality of scores for the plurality of quantitative measures of the second test program,
wherein the plurality of quantitative measures represents at least three of the following:
a capacity of the first test program or the second test program to test one or more operations of the executable program;
a capacity of the first test program or the second test program to test a plurality of linearly independent paths through the executable program;
a capacity of the first test program or the second test program to determine a quantitative measure of complexity of the executable program from a plurality of operations and a plurality of operands in the executable program;
a capacity of the first test program or the second test program to determine a measure of maintainability and a prediction of maintainability of the executable program;
a capacity of the first test program or the second test program to determine a statistical time measure between failure measure of the executable program;
a time required for the first test program or the second test program to execute the executable program;
a capacity of the first test program or the second test program to test dependencies of the executable program; or
a capacity of the first test program or the second test program to determine an association between testing of the executable program and requirements defining a behavior of the executable program;
computing a second weighted score for the second test program,
the computing the second weighted score based on the plurality of scores for the plurality of quantitative measures of the second test program,
the second weighted score representing the ability of the second test program to test the executable program, and
the computing the second weighted score performed using the one or more processing devices;
comparing the first weighted score to the second weighted score; and
selecting the first test program to test the executable program based on the comparing,
the selecting the first test program indicating that the ability of the first test program to test the executable program exceeds the ability of the second test program to test the executable program,
the selecting excluding the second test program from being executed,
and the selecting performed using the one or more processing devices.

2. The method of claim 1, further comprising:
storing the first score and the second score.

3. The method of claim 1, further comprising:
executing the first test program;
generating a test result based on the executing the first test program;
and logging the test result.

4. The method of claim 3, wherein logging the test result further
comprises: logging a test time of the executing.

5. The method of claim 1, further
comprising: executing the first test program;
receiving an indication of a test failure, the receiving based on the executing of the first test program; and
incorporating information about the test failure in a history log.

6. The method of claim 1, further comprising:
executing the first test program using a distributed computing environment.

7. The method of claim 1, wherein:
the executable program includes a graphical model, and
the plurality of quantitative measures represents at least two of the following:
a capacity of the first test program or the second test program to test paths through the graphical model;
a capacity of the first test program or the second test program to provide test coverage for text based code generated from the graphical model; or
a capacity of the first test program or the second test program to provide test coverage for semantics of the graphical model.

8. A non-transitory computer-implemented medium storing:
one or more instructions that, when executed by one or more processors, cause the one or more processors to:
analyze a plurality of attributes of a first test program for testing an executable program;

generate a plurality of values for the plurality of
attributes of the first test program,
the generating based on the analyzing;
represent a plurality of quantitative measures for the
first test program using the plurality of values;
compute a plurality of scores for the plurality of
quantitative measures of the first test program;
compute a first weighted score for the first test program
based on the plurality of scores,
the first weighted score representing the ability of the
first test program to test the executable program,
the executable program comprising a portion of a
graphical model that is executable in a graphical
modeling environment;
interact with a second test program for testing the
executable program, the second test program being a
separate and distinct program from the first test
program,
the second test program including the plurality of
attributes;
analyze the plurality of attributes of the second test
program;
generate a plurality of values for the plurality of
attributes of the second test program,
the generating based on the analyzing the plurality of
attributes of the second program;
represent the plurality of quantitative measures for the
second test program using the plurality of values of
the second test program;
compute a plurality of scores for the plurality of
quantitative measures of the second test program,
wherein the plurality of quantitative measures represents at least three of the following:
a capacity of the first test program or the second test
program to test one or more operations of the
executable program;
a capacity of the first test program or the second test
program to test a plurality of linearly independent
paths through the executable program;
a capacity of the first test program or the second test
program to determine a quantitative measure of
complexity of the executable program from a
plurality of operations and a plurality of operands
in the executable program;
a capacity of the first test program or the second test
program to determine a measure of maintainability and a prediction of maintainability of the
executable program;
a capacity of the first test program or the second test
program to determine a statistical time measure
between failure measure of the executable program;
a time required for the first test program or the
second test program to execute the executable
program;
a capacity of the first test program or the second test
program to test dependencies of the executable
program; or
a capacity of the first test program or the second test
program to determine an association between testing of the executable program and requirements
defining a behavior of the executable program;
compute a second weighted score for the second test
program,
the computing the second weighted score based on
the plurality of scores for the plurality of quantitative measures of the second test program, and the second weighted score representing the ability of
the second test program to test the executable
program;
compare the first weighted score to the second
weighted score; and
select the first test program to test the executable
program based on the comparing,
the selecting the first test program indicating that the
ability of the first test program to test the executable program exceeds the ability of the second test
program to test the executable program, and
the selecting excluding the second test program from
being executed.
9. The medium of claim 8, further storing:
one or more instructions that, when executed by the one
or more processors, cause the one or more processors
to:
store the first score and the second score.
10. The medium of claim 8, further storing:
one or more instructions that, when executed by the one
or more processors, cause the one or more processors
to:
execute the first test program, the executing generating
a test result, and
log the test result.
11. The medium of claim 10, wherein logging the test
result further comprises logging test time of the executing.
12. The medium of claim 8, further storing:
one or more instructions that, when executed by the one
or more processors, cause the one or more processors
to:
execute the first test program,
receive a test failure from execution of the first test
program; and
incorporate the test failure in a history log.
13. The medium of claim 8, further storing:
one or more instructions that, when executed by the one
or more processors, cause the one or more processors
to:
execute the first test program using a distributed computing environment.
14. The medium of claim 8, wherein:
the executable program includes a graphical model, and
the plurality of quantitative measures represents at least
two of the following:
a capacity of the first test program or the second test
program to test paths through the graphical model;
a capacity of the first test program or the second test
program to provide test coverage for text based code
generated from the graphical model; or
a capacity of the first test program or the second test
program to provide test coverage for semantics of the
graphical model.
15. A system comprising:
one or more processors executing instructions for:
analyzing a plurality of attributes of a first test program
for testing an executable program;
generating a plurality of values for the plurality of
attributes of the first test program,
the generating based on the analyzing;
representing a plurality of quantitative measures for the
first test program using the plurality of values;
computing a plurality of scores for the plurality of
quantitative measures of the first test program;
computing a first weighted score for the first test
program based on the plurality of scores, the first weighted score representing the ability of the first test program to test the executable program, the executable program comprising a portion of a graphical model that is executable in a graphical modeling environment; interacting with a second test program for testing the executable program, the second test program being a separate and distinct program from the first test program, the second test program having including the plurality of attributes;

analyzing the plurality of attributes of the second test program;

generating a plurality of values for the plurality of attributes of the second test program,
the generating based on the analyzing the plurality of attributes of the second program;

representing the plurality of quantitative measures for the second test program using the plurality of values of the second test program;

computing a plurality of scores for the plurality of quantitative measures of the second test program;

wherein the plurality of quantitative measures represents at least three of the following:
 a capacity of the first test program or the second test program to test one or more operations of the executable program;
 a capacity of the first test program or the second test program to test a plurality of linearly independent paths through the executable program;
 a capacity of the first test program or the second test program to determine a quantitative measure of complexity of the executable program from a plurality of operations and a plurality of operands in the executable program;
 a capacity of the first test program or the second test program to determine a measure of maintainability and a prediction of maintainability of the executable program;
 a capacity of the first test program or the second test program to determine a statistical time measure between failure measure of the executable program;
 a time required for the first test program or the second test program to execute the executable program;
 a capacity of the first test program or the second test program to test dependencies of the executable program; or
 a capacity of the first test program or the second test program to determine an association between testing of the executable program and requirements defining a behavior of the executable program;

computing a second weighted score for the second test program,
 the computing the second weighted score based on the plurality of scores for the plurality of quantitative measures of the second test program, and
 the second weighted score representing the ability of the second test program to test the executable program;

comparing the first weighted score to the second weighted score;

selecting the first test program to test the executable program based on the comparing,
 the selecting the first test program indicating that the ability of the first test program to test the executable program exceeds the ability of the second test program to test the executable program, and
 the selecting excluding the second test program from being executed; and a storage for:
 storing the first score and the second score.

* * * * *

UNITED STATES PATENT AND TRADEMARK OFFICE
CERTIFICATE OF CORRECTION

PATENT NO. : 9,489,290 B1
APPLICATION NO. : 14/072515
DATED : November 8, 2016
INVENTOR(S) : David M. Boissy et al.

It is certified that error appears in the above-identified patent and that said Letters Patent is hereby corrected as shown below:

In the Claims

Column 19, Line 30, in Claim 1, after "program" delete "having"

Column 23, Line 9, in Claim 15, after "program" delete "having"

Signed and Sealed this
Eighteenth Day of April, 2017

Michelle K. Lee
*Director of the United States Patent and Trademark Office*